United States Patent [19]
Gamell

[11] 3,935,848
[45] Feb. 3, 1976

[54] SUPERCHARGER SYSTEM FOR INTERNAL COMBUSTION ENGINE

[75] Inventor: Joseph A. Gamell, Kalamazoo, Mich.

[73] Assignee: Joseph Gamell Industries, Incorporated, Kalamazoo, Mich.

[22] Filed: May 10, 1974

[21] Appl. No.: 468,810

[52] U.S. Cl. ............... 123/119 CF; 60/601; 60/607
[51] Int. Cl.² ......................................... F02D 23/00
[58] Field of Search ............ 60/597, 598, 601, 607, 60/325; 123/119 C, 119 CF

[56] References Cited
UNITED STATES PATENTS

| | | | |
|---|---|---|---|
| 2,109,237 | 2/1938 | Lustig | 60/607 X |
| 2,565,482 | 8/1951 | Dolza et al. | 60/601 |
| 2,571,179 | 10/1951 | Alexander | 60/325 |
| 3,190,068 | 6/1965 | Williams et al. | 60/607 |
| 3,473,322 | 10/1969 | Wolf | 60/607 |

Primary Examiner—Charles J. Myhre
Assistant Examiner—James D. Liles
Attorney, Agent, or Firm—Woodhams, Blanchard and Flynn

[57] ABSTRACT

An internal combustion engine, particularly for use with a vehicle having a turbine-driven supercharger for supplying air to the intake manifold. The turbine is continuously driven by a pressurized fluid, particularly water, which is continuously maintained in a liquid state. The water is stored within a tank and is supplied by a pump to the turbine for rotatably driving same. The pump also supplies the pressurized water to a further passage which communicates with the intake manifold to selectively permit injection of water into the fuel-air mixture supplied to the combustion chamber.

10 Claims, 3 Drawing Figures

SUPERCHARGER SYSTEM FOR INTERNAL COMBUSTION ENGINE

FIELD OF THE INVENTION

This invention relates to an improved turbine-driven supercharger system for use on an internal combustion engine and, in particular, to a system wherein the turbine is driven by water which is continuously maintained in the liquid state, which water can also be selectively injected into the fuel-air mixture supplied to the combustion chamber.

BACKGROUND OF THE INVENTION

It has been generally recognized by many engine designers that supercharging is one of the more effective ways of improving engine performance, particularly the power output of an engine. However, most prior attempts using supercharging have utilized a turbine for driving a centrifugal compressor with the turbine being driven by the engine exhaust gases. While such supercharging systems have produced a noticeable increase in engine output power, they nevertheless have not gained wide acceptance in view of the numerous control problems associated with same, such as the ineffectiveness of the turbine at low engine speeds. Further, under starting conditions, and particularly under cold starting conditions, turbine drives which rely upon exhaust gases are of little, if any, benefit. The use of exhaust gases for driving the turbine also creates a rather serious corrosion problem.

In an attempt to improve on the supercharger systems, attemps have been made to utilize different fluids for driving the turbine, such as freon. However, systems of this type are designed to operate as a refrigeration cycle and thus require that the freon be supplied to a jacket surrounding the combustion chamber so as to absorb heat. This system, like the use of exhaust gases, thus relies upon the heat of the engine in order to operate under optimum conditions. This system is also unacceptable under many operating conditions, particularly during starting and warming up of the engine. This system also requires rather elaborate and complex equipment in order for the freon to undergo a proper refrigeration cycle.

One of the primary problems explained with supercharger systems, as briefly explained above, results from the fact that the working fluid is normally in a gaseous state when it is supplied to the turbine for driving same. Needless to say, efficient and effective driving of the turbine by a gaseous fluid can be achieved only when the gaseous fluid is maintained under a substantially high pressure and is supplied to the turbine at a substantially high velocity. These conditions are obviously difficult to achieve during starting or during periods of low engine speed. Such supercharger systems have thus been effective only under sealed operating conditions.

Accordingly, it is an object of the present invention to provide an improved turbine-driven supercharger system for use with an internal combustion engine, particularly on a vehicle, for permitting the engine to develop increased power and torque. The supercharger system of the present invention also permits quicker cold starting of the engine and faster warm-up of the engine since the supercharger does not rely upon manifold or exhaust heat for the successful operation of same.

It is also an object of the present invention to provide an improved supercharger system, as aforesaid, wherein the working fluid is continuously maintained in a liquid state to permit efficient driving of the turbine. The system of the present invention preferably utilizes water for driving of the turbine.

A further object of the present invention is to provide an improved supercharger system, as aforesaid, which utilizes a conventional working fluid such as water that the working fluid can be economically and easily replaced if necessary, and which fluid is not damaging to the engine or harmful to persons in a vicinity of the engine should accidental escape of the fluid occur.

Another object of the present invention is to provide a supercharger system which, as aforesaid, utilizes water for driving the turbine and which system can also be utilized for injecting water into the fuel-air mixture as supplied to the combustion chamber, thereby permitting substantially increased fuel economy and substantially reduced emission of exhaust gas pollutants.

Other objects and purposes of the present invention will be apparent to persons skilled in this art upon reading the following specification and inspecting the accompanying drawings.

Figure 1:
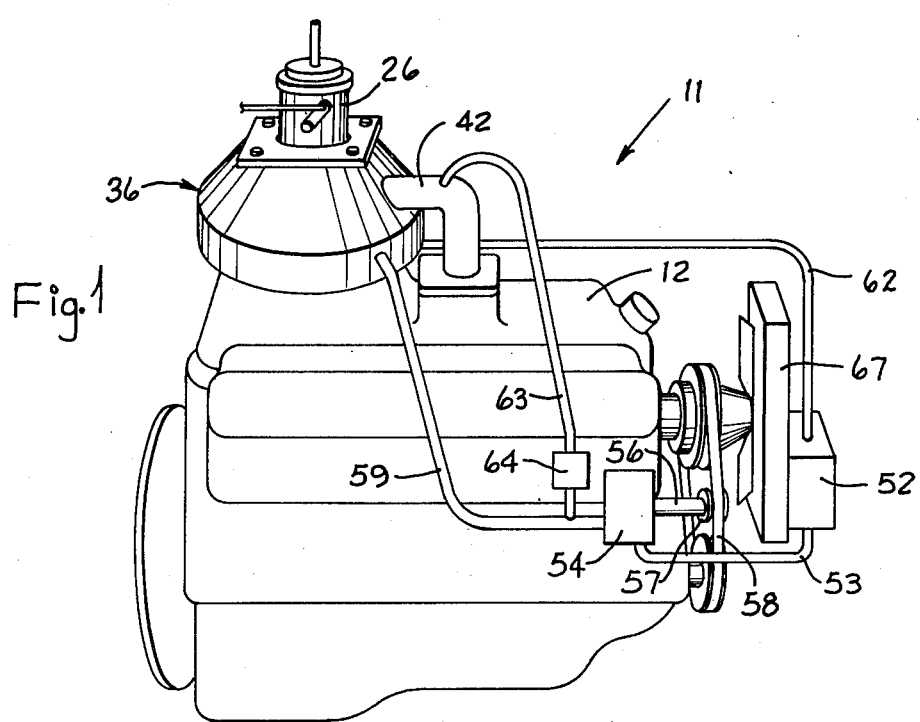
FIG. 1 is a perspective view of an internal combustion engine equipped with a supercharger system according to the present invention.

Certain terminology will be used in the following description for convenience and reference only and will not be limiting. For example, the words "upwardly", "downwardly", "rightwardly", and "leftwardly" will refer to the directions in the drawings to which reference is made. The words "inwardly" and "outwardly" will refer to directions toward and away from, respectively, the geometric center of the system and designated parts thereof. Said terminology will include the words above specifically mentioned, derivations thereof and words of similar import.

SUMMARY OF THE INVENTION

The objects and purposes of the present invention are met by providing an internal combustion engine, particularly in association with a vehicle, and having a turbine-driven supercharger for supplying greater quantities of air to the intake manifold of the engine. The turbine is driven by a relatively closed fluid system which utilizes water as the working fluid. The fluid system includes a conventional storage tank containing water therein, with water being withdrawn from the tank by a pump which is driven by the engine. The pump supplies pressurized water in a liquid state to the turbine for driving same, which turbine in turn causes a high speed rotation of the supercharger compressor. The water from the turbine is then returned to the tank, whereby the water remains in a liquid state at all times. The closed fluid system may also include a passageway communicating with the intake manifold for permitting injection of water into the fuel-air mixture flowing therethrough.

DETAILED DESCRIPTION

Figure 2:
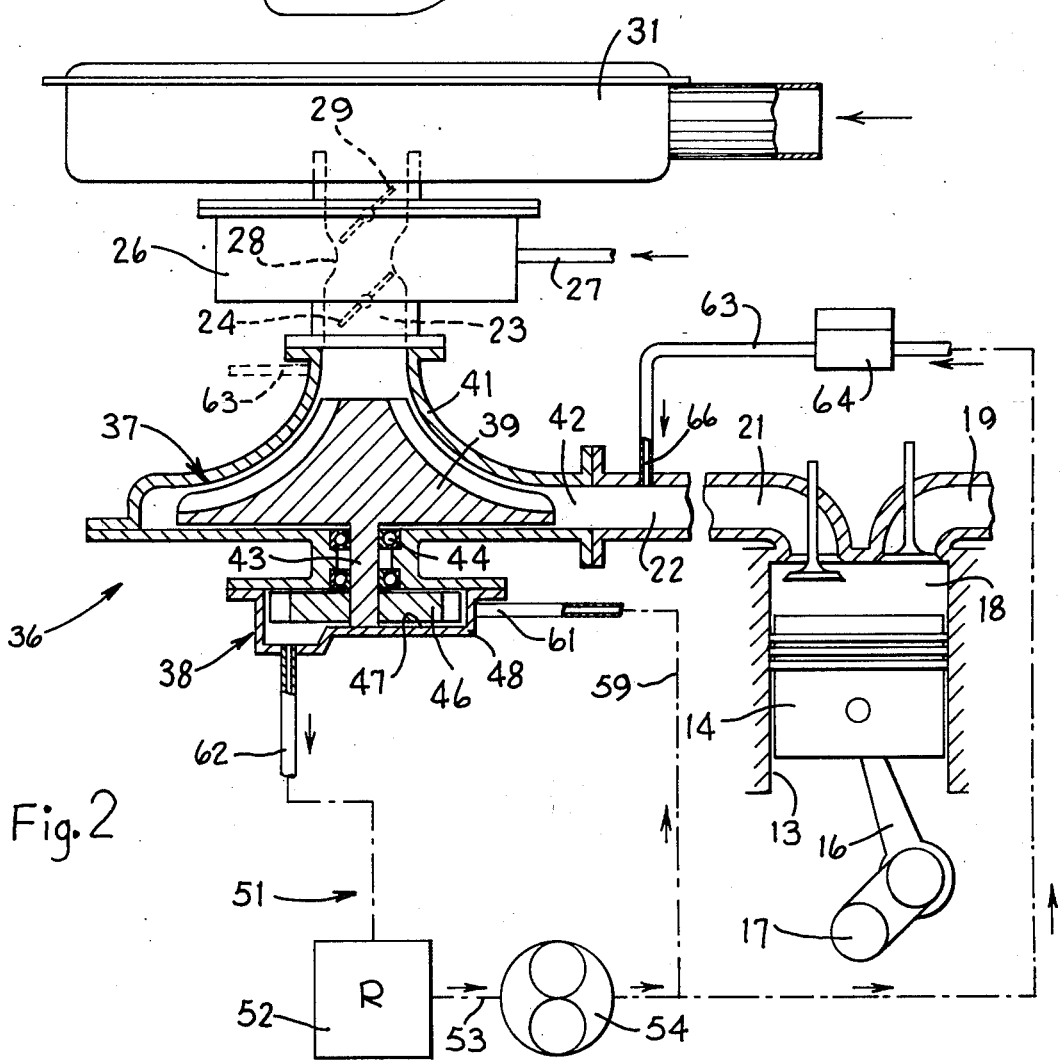
FIG. 2 is a broken, sectional, side-elevational view illustrating the improved supercharger system of the present invention.

FIG. 1 illustrates therein a conventional internal combustion engine 11, particularly a multiple cylinder engine as used in association with a vehicle. The engine 11 includes a block or housing 12 having a plurality of bores formed therein, one bore 13 being illustrated in FIG. 2. A piston 14 is slidably positioned within the bore 13 and is connected by a conventional connecting rod 16 to a rotating crankshaft 17. The piston 14, in conjunction with the housing 12, defines a combustion chamber 18 which communicates with an exhaust passage 19 and an intake passage 21. The intake passage 21 in turn communicates with a conventional intake manifold 22 which, as illustrated in FIG. 2, communicates with a supply passage 23. The passage 23 contains therein a conventional movable throttle plate 24. A conventional carburetor 26 is disposed upstream of the throttle plate 24 and is supplied with a combustible fuel, such as gasoline, by means of a fuel line 27. Fuel is injected in a conventional manner into the inflowing air stream, such as in the vicinity of the venturi 28. The inlet to the carburetor is controlled by a conventional choke plate 29, with air being supplied to the passageway 23 through a conventional air cleaner 31.

The engine 11 has an improved supercharger system 36 associated with the intake manifold 22, which supercharger system as illustrated in FIG. 2 includes a compressor 37 driven by a turbine 38. The compressor 37 includes a rotatable bladed impeller 39 rotatably supported within a housing 41, which housing has the inlet end thereof coaxially aligned with the supply passage 23. The impeller housing 41 also has a discharge opening 42 formed therein which communicates with the intake manifold 22.

The compressor impeller 39 has a rotatable drive shaft 43 fixedly secured thereto, which shaft is rotatably supported on housing 41 by a conventional anti-friction bearing 44. The turbine 38 includes a bladed turbine wheel 46 fixedly secured to the lower end of the shaft 43 and disposed within a compartment 47 defined within the interior of a housing 48, which housing 48 is fixedly connected to the compressor housing 41.

The compartment 47 as defined within the turbine housing 48 is substantially closed and forms part of a closed fluid system 51, which system 51 contains therein a preselected quantity of an incompressable working fluid which is continuously maintained in a liquid state. The working fluid preferably comprises water. The water is normally stored within a tank or reservoir 52 which communicates by a conduit 53 with a pump 54. The pump is driven by a shaft 56 which, as illustrated in FIG. 1, has a pulley 57 on the end thereof. The pulley 57 is driven by a belt 58 which is drivingly coupled to the engine crankshaft. The pump 54 supplies pressurized water in a liquid state to a supply conduit 59 which is fixedly connected to the housing 48, which conduit 59 terminates in a jet or nozzle 61 which discharges the pressurized water inwardly into the compartment 47 so that the water impinges on the blades associated with the turbine wheel 46 so as to rotatably drive same.

The water which is used for rotatably driving the turbine wheel 46 is discharged from the compartment 47 by means of a drain conduit 62, which conduit at its lower end communicates with the reservoir 52. Flow through the conduit 62 to the reservoir 52 normally occurs by means of gravity.

The system 51 as illustrated in FIG. 2 is also preferably provided with a water injection system associated therewith for permitting water to be selectively injected into the fuel-air mixture flowing through the intake manifold 22. For this purpose, the pump 54 communicates with a further conduit 63. Flow through the conduit 63 is normally controlled by means of a conventional valve, such as a solenoid operated valve 64. The conduit 63 terminates a discharged jet or nozzle 66 which communicates with the intake manifold 22 for permitting water in a liquid state to be injected in atomized or particle into the fuel-air mixture.

The conduit 63 can be connected so as to inject the water upstream of the compressor, if desired, as illustrated by the conduit 63 which is shown in dotted lines in FIG. 2. This variation will result in greater atomization of the water particles as they pass through the compressor.

OPERATION

The operation of the present invention will be briefly described to insure a complete understanding thereof.

The working fluid, namely water, is withdrawn from the tank 52 through the conduit 53 for supply to the pump 54, which in turn pressurizes the water and supplies the same to the conduit 59. The conduit 59 discharges the pressurized water which is in a liquid state against the blades of the turbine wheel 46, thereby causing high speed rotation thereof. The water used to drive the turbine wheel collects within the compartment 47 and then flows by gravity through the drain conduit 62 back to the bank 52.

The rotation of turbine wheel 46 causes a corresponding high-speed rotation of the compressor 39. Air is drawn through the supply passage 23 and supplied to the inlet end of the compressor 39, which causes centrifugal pressurization of the air as it is supplied to the intake manifold 22. The high velocity air, containing therein atomized fuel, is then supplied to the combustion chamber 18, whereupon the mixture is ignited to cause a power reciprocation of the piston 14 in a conventional manner. When the carburetor 26 is located upstream of the compressor 39, so that a fuel-air mixture is supplied to the compressor, the centrifugal effect of the compressor causes the fuel to be uniformally atomized and intermixed with the air, whereby the resulting mixture is extremely uniform to thus greatly facilitate the subsequent combustion of same.

Since the pump 54 is driven directly from the engine crankshaft, the flow of pressurized water through the conduit 59 is thus substantially proportional to engine speed. The quantity of water discharged against the turbine wheel 46, by being proportional to engine speed, also causes the turbine wheel 46 to be rotated substantially proportional to engine speed. In this manner, the supercharger supplies to the intake manifold 22 a quantity of air which is proportionally related to engine speed.

When water injection into the fuel-air mixture is desired, then the valve 64 can be opened by means of a conventional control circuit (not shown). The pump 54 will then supply pressurized fluid through the conduit 63 whereby water will be discharged through the jet 66 into the high velocity stream of fuel-air mixture flowing through the intake manifold 22.

In the system of the present invention, as illustrated in FIG. 1, the reservoir 52 can be located forwardly of the vehicle radiator 67. In this manner, the water within the tank 52 is maintained in a cool or low temperature condition, which is particularly desirable when the water is being injected into the fuel-air mixture since the use of cool water for injection into the fuel-air mixture minimizes the temperature of the mixture and likewise minimizes the creation of undesired pollutants. This is also believed to result in substantially increased fuel economy. Further, all of the conduits associated with the fluid system are preferably positioned relative to the engine so as to minimize the absorption of heat by the water, thereby insuring that the water within the systems is maintained in a liquid state at all times to thus result in the most efficient driving of the turbine wheel while utilizing a minimum quantity of working fluid.

MODIFICATION

Figure 3:
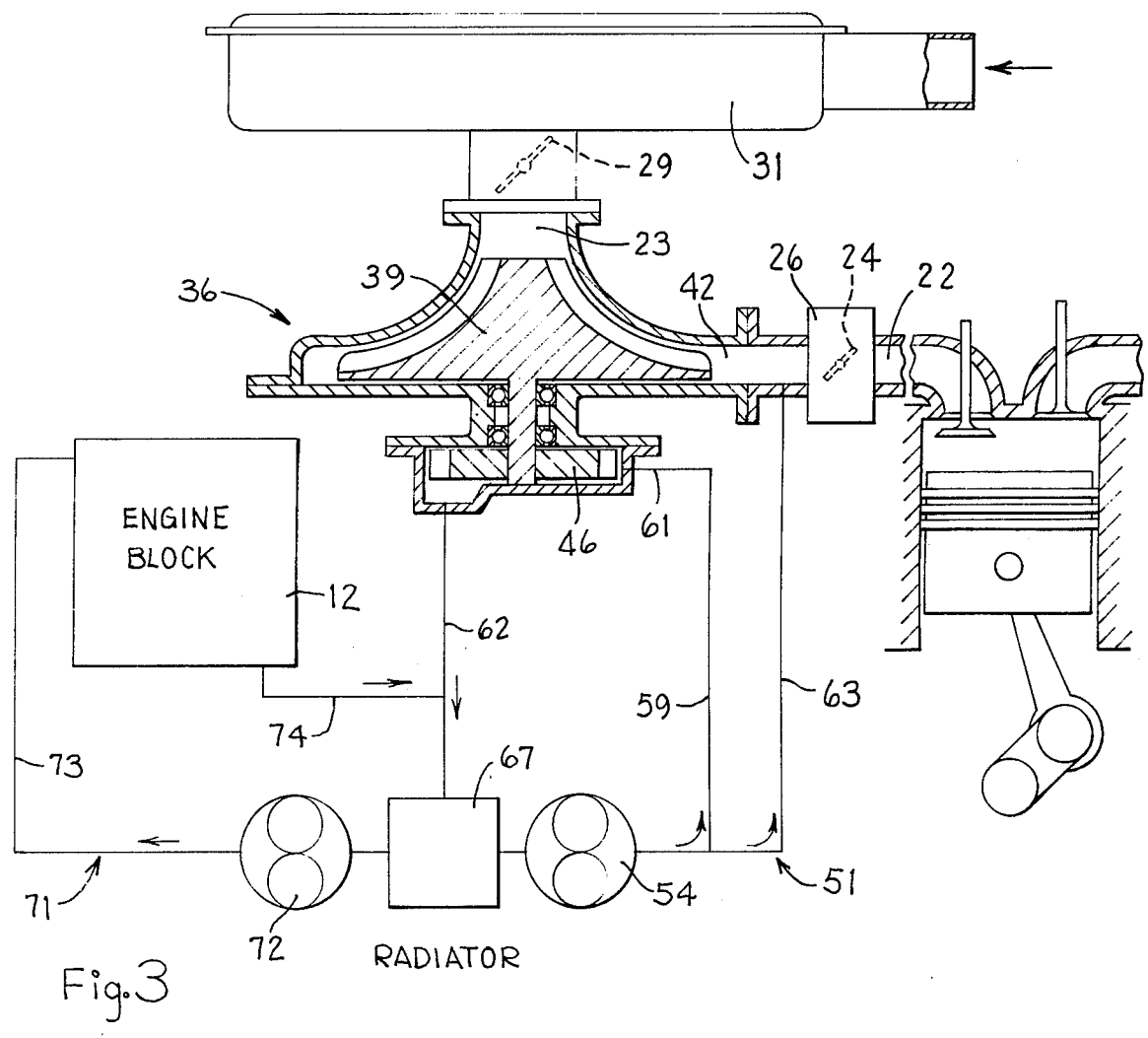
FIG. 3 is a view similar to FIG. 2 but illustrating a variation of the present invention.

FIG. 3 illustrates wherein a modification of the structure of FIG. 2, which modification operates in substantially the same manner as FIG. 2. Thus, the corresponding parts of the embodiment illustrated in FIG. 3 have been identified by the same reference numerals utilized in FIG. 2.

In the embodiment illustrated in FIG. 3, the working fluid, namely water, is again supplied from pump 54 through conduit 59 for driving the turbine wheel 46, with the water then being returned by the drain conduit 62 to the storage tank. In this embodiment, the storage tank may comprise the radiator 67 of the vehicle. The radiator 67, in addition to being associated with the fluid system 51 used for driving the turbine, is also associated with a cooling system 71. The cooling system 71 includes a further pump 72 which is in communication with and receives water from the radiator 67, with the pump 72 supplying water through the conduit 73 to the main engine block 12 for cooling same. The water from the engine block is then returned to the radiator via the intermediate drain conduit 74. The pump 72 is driven from the engine crankshaft in a conventional manner and may be driven similar to the pump 54 as illustrated in FIG. 1.

The pump 72 is normally of rather low pressure capacity since the water supplied to the cooling system 71 is preferably at a relatively low pressure level. The pump 54, on the other hand, is of a rather high pressure capacity since the fluid which is used for driving the turbine is preferably highly pressurized in order to result in optimum driving of the turbine wheel.

The supercharger of the present invention is thus highly desirable since it permits the use of a substantially incompressible working fluid which is continuously maintained in a liquid state, which working fluid is used for driving the turbine so as to permit the use of a turbine wheel of relatively small size while at the same time permitting relatively large torques to be developed by the turbine wheel. Further, the use of a liquid for driving the turbine permits adequate driving of the turbine even during engine starting or at low engine speeds, since the system is not dependent upon a compressable gas nor is the system dependent upon the exhaust heat generated by the engine. Still further, the use of water as a working fluid is highly desirable since same does not create any serious corrosion problems with respect to the turbine, and at the same time such a working fluid is not dangerous and is readily and inexpensively available.

As also illustrated in FIG. 3, the throttle plate 24 and the carburetor 26 can be located downstream of the supercharger 36 if desired.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In combination with an internal combustion engine, a supercharger system comprising:
   rotatable centrifugal compressor means having an inlet port for receiving a compressible gas and an outlet port for discharge of compressible gas to the engine, said compressor means including a rotatable compressor wheel;
   rotatable turbine means connected to said compressor means for rotatably driving same, said turbine means including a rotatable turbine wheel;
   a fluid system for driving said turbine wheel, said fluid system containing therein an incompressible working fluid which is continuously maintained in a liquid state, said fluid system also including,
   tank means containing therein a supply of said working fluid,
   conduit means defining a passage providing communication between said tank means and said turbine means, said passage having nozzle means associated with the discharge end thereof for directing said working fluid while in a liquid state against said turbine wheel to rotatably drive same,
   pump means driven by said engine for pressurizing the working fluid and for supplying same to said nozzle means, and
   drain means associated with said turbine means for collecting the liquid working fluid supplied to said turbine wheel;
   said fluid system being independent of the exhaust gases discharged from said engine whereby said turbine is driven solely by said liquid working fluid.

2. A combination according to claim 1, wherein said working fluid comprises water, passage means communicating with the inlet and outlet ports of said compressor means, and injection means providing communication between said pump means and said passage means for permitting injection of water into the compressible gas flowing through said passage means.

3. A combination according to claim 1, wherein said compressor means includes a substantially closed compressor housing defining therein a compartment in which is positioned said compartment wheel, said turbine means including a substantially closed turbine housing defining therein a further compartment in which is positioned said turbine wheel, said turbine and compressor compartments being sealingly isolated from one another, the compressor housing being disposed above the turbine housing so that the compressor wheel is vertically spaced upwardly above the turbine wheel, the turbine and compressor wheels being coaxially aligned, and shaft means extending between and nonrotatably connecting said compressor wheel and said turbine wheel, said shaft means extending substantially vertically whereby said turbine and compressor wheels are rotatable about a substantially common vertical axis.

4. A combination according to claim 3, wherein said turbine wheel is of substantially smaller diameter than said compressor wheel.

5. A combination according to claim 1, wherein said working fluid comprises water.

6. In an internal combustion engine for a vehicle, said engine having a housing defining a compartment therein, a piston movably disposed within said compartment and cooperating with said housing for defining a combustion chamber, an intake manifold in communication with said combustion chamber for supplying a fuel-air mixture thereto, a centrifugal compressor having an outlet opening communicating with said intake manifold, a supply manifold communicating with an inlet opening associated with said compressor for supplying air thereto, and a rotatable turbine connected to said centrifugal compressor for rotating same, the improvement comprising a fluid system containing therein a quantity of a substantially incompressible working fluid which is continuously maintained in a liquid state for driving said turbine, said fluid system including tank means containing therein said liquid working fluid, conduit means connected between said tank means and said turbine and defining a passage for permitting flow of said liquid working fluid from said tank means to said turbine, said conduit means terminating in nozzle means for discharging said liquid working fluid against said turbine for rotatably driving same, and pump means associated with said conduit means for pressurizing said working fluid while maintaining said working fluid in a liquid state and for causing said pressurized working fluid to be discharged through said nozzle means for driving said turbine.

7. An engine according to claim 6, wherein said liquid working fluid comprises water, and pipe means connected between said pump means and said intake manifold, said pipe means terminating in a nozzle for discharging water into the fuel-air mixture flowing through said intake manifold.

8. An engine according to claim 6, wherein said tank means comprises the radiator of the engine.

9. An engine according to claim 8, including further conduit means providing communication between said radiator and said housing for supplying fluid to said housing for cooling same, and further pump means for pressurizing said fluid, said further pump means being a relatively low pressure pump and said first-mentioned pump means being a relatively high pressure pump.

10. An engine according to claim 6, wherein the fluid system for driving the turbine is independent of the hot exhaust gases discharged from the combustion chamber.

* * * * *

UNITED STATES PATENT AND TRADEMARK OFFICE
CERTIFICATE OF CORRECTION

PATENT NO. : 3 935 848
DATED : February 3, 1976
INVENTOR(S) : Joseph A. Gamell

It is certified that error appears in the above-identified patent and that said Letters Patent are hereby corrected as shown below:

Column 6, line 54; change "compartment" to

---compressor---.

Signed and Sealed this eighteenth Day of May 1976

[SEAL]

Attest:

RUTH C. MASON
Attesting Officer

C. MARSHALL DANN
Commissioner of Patents and Trademarks